(12) United States Patent
Chi

(10) Patent No.: US 6,290,356 B1
(45) Date of Patent: Sep. 18, 2001

(54) TEMPLE ADJUSTING DEVICE FOR EYEGLASSES

(75) Inventor: Kang Chi, Tainan Hsien (TW)

(73) Assignee: Megasafe Products, Inc., Tainan (TW)

( * ) Notice: Subject to any disclaimer, the term of this patent is extended or adjusted under 35 U.S.C. 154(b) by 0 days.

(21) Appl. No.: 09/742,233

(22) Filed: Dec. 22, 2000

(51) Int. Cl.$^7$ ..................................................... G02B 1/02
(52) U.S. Cl. ............................ 351/120; 351/110; 351/111
(58) Field of Search .................................. 351/120, 111, 351/110, 118, 119, 140, 153, 41, 83, 86

(56) References Cited

U.S. PATENT DOCUMENTS 5,946,072 * 8/1999 Canavan ................................ 351/120

* cited by examiner

*Primary Examiner*—Hung Xuan Dang
(74) *Attorney, Agent, or Firm*—Rosenberg, Klein & Lee

(57) ABSTRACT

A temple-adjusting device for eyeglasses includes a movable base, a fix member and a lens frame. The movable base has a chamber provided with a saw-teeth section formed on a rear side. The fix member fits tightly in the chamber, having saw-teeth formed on a rear end surface to engage the saw-teeth section of the movable base. The movable base has its front end pivotally connected to a lens frame or two lens formed integral. Then a temple is pivotally connected to a rear end of the movable base, and when the temple is moved up or down the saw-teeth may change engaging location with the saw-teeth section of the movable base, adjusting an angle between the temple and the lens frame for a user wearing a pair of eyeglasses comfortably.

1 Claim, 4 Drawing Sheets

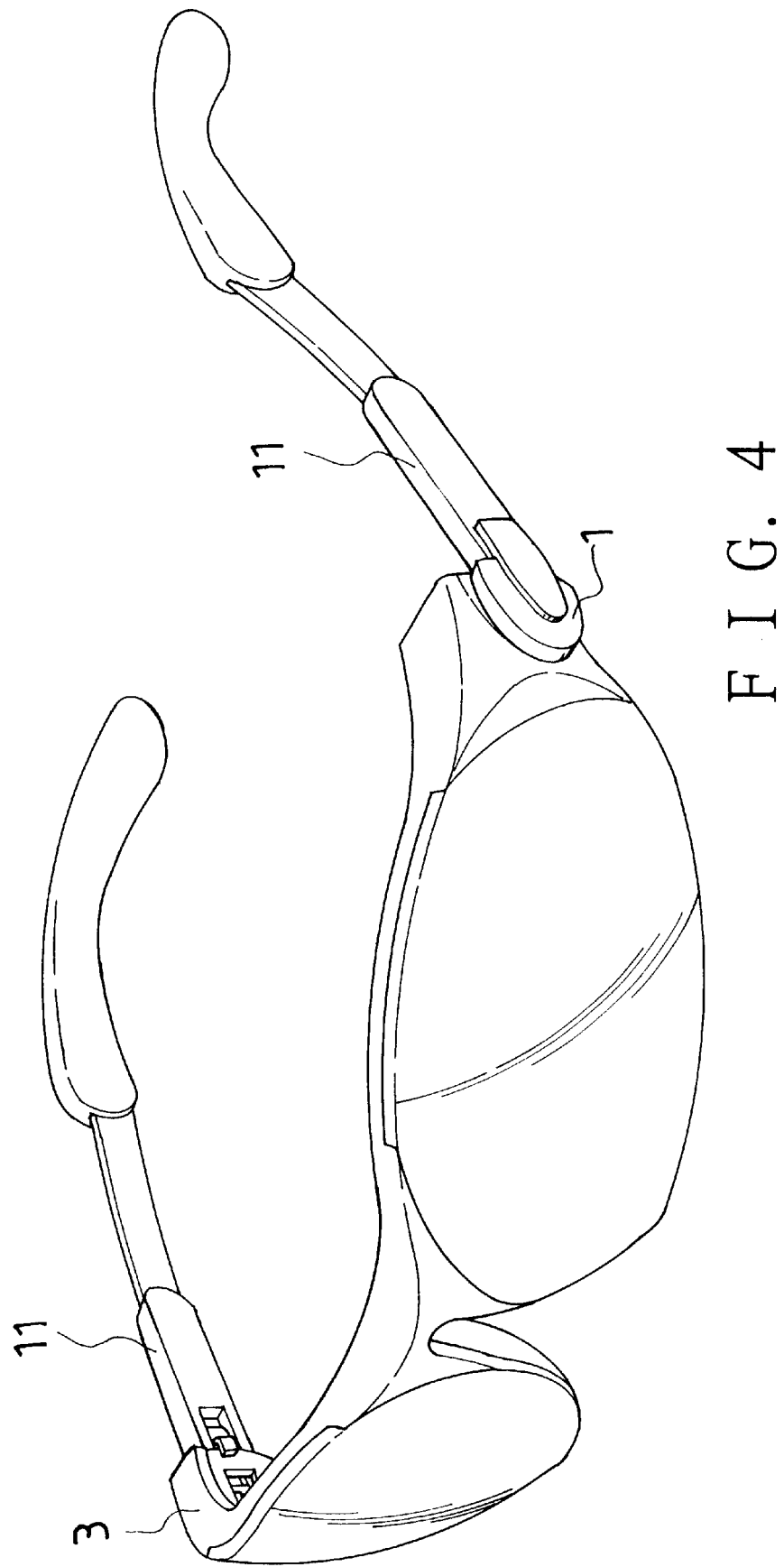
F I G. 4

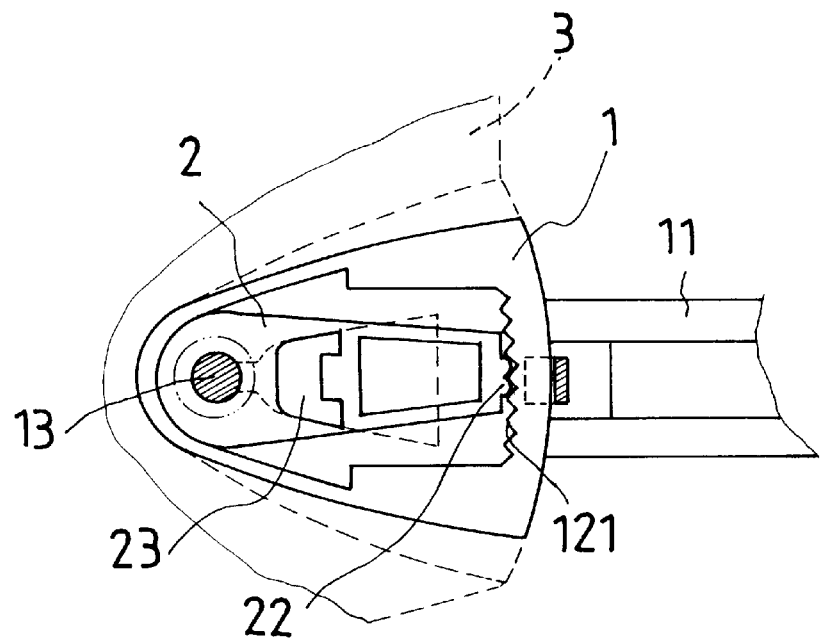
F I G. 5
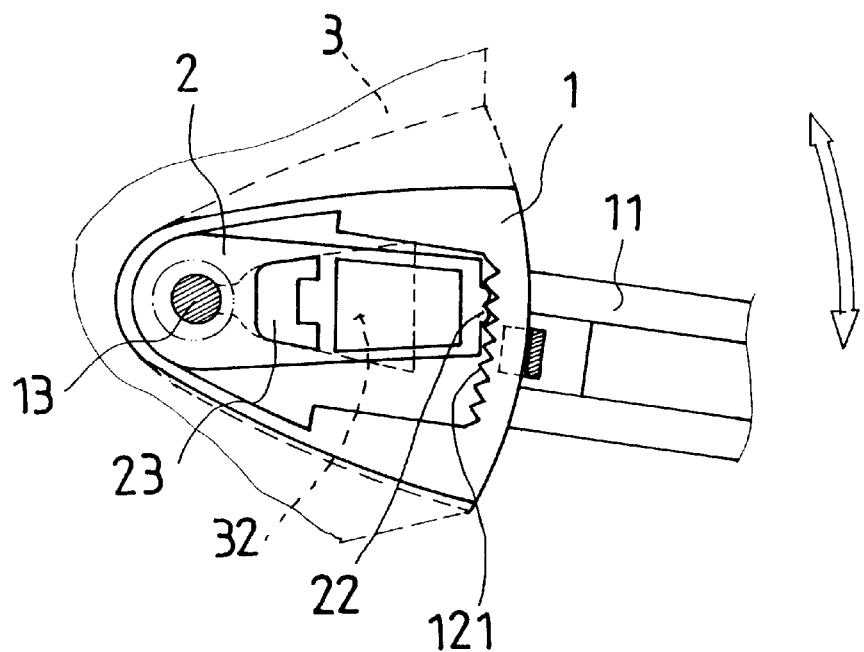
F I G. 6

TEMPLE ADJUSTING DEVICE FOR EYEGLASSES

BACKGROUND OF THE INVENTION

This invention relates to a temple adjusting device for eyeglasses, particularly to one possible to adjust the angle of the temples of a pair of eyeglasses to suit to the size of the face of a user wearing eyeglasses comfortably.

There are a wide variety of eyeglasses having different angles of temples, and every person has a different face so that a user may not find easily a pair of eyeglasses just suitable to wear comfortably.

SUMMARY OF THE INVENTION

This invention has been devised to offer a temple adjusting device for eyeglasses, which includes a movable base having an end to pivotally connect to a temple, a chamber formed in the base and having a saw-teeth section on its rear side, and a fix member fitting firmly in the chamber and having saw teeth formed on a rear end surface to engage the saw-teeth section of the movable base. After the movable base is pivotally connected to a lens frame by means of a sidewise shaft of the movable base fitting in an insert hole of the lens frame. Then a temple is moved up or down to move the movable base to move and down also to let the engaging location of the saw-teeth section of the chamber and the saw-teeth of the fix member also fitted in an aperture of the lens frame so that the angle between the temple and the lens frame can be adjusted to suit to the face of a user, who can wear a pair of eyeglasses comfortably.

BRIEF DESCRIPTION OF DRAWINGS

This invention will be better understood by referring to the accompanying drawings, wherein:

FIG. 4 is a perspective view of a pair of eyeglasses provided with the temple adjusting device of the present invention.

FIG. 5 is a side cross-sectional view of the temple-adjusting device of the present invention.

FIG. 6 is a side cross-sectional view of the temple-adjusting device of the present invention, shown how to adjust the angle of a temple.

DETAILED DESCRIPTION OF THE PREFERRED EMBODIMENT

Figure 1:
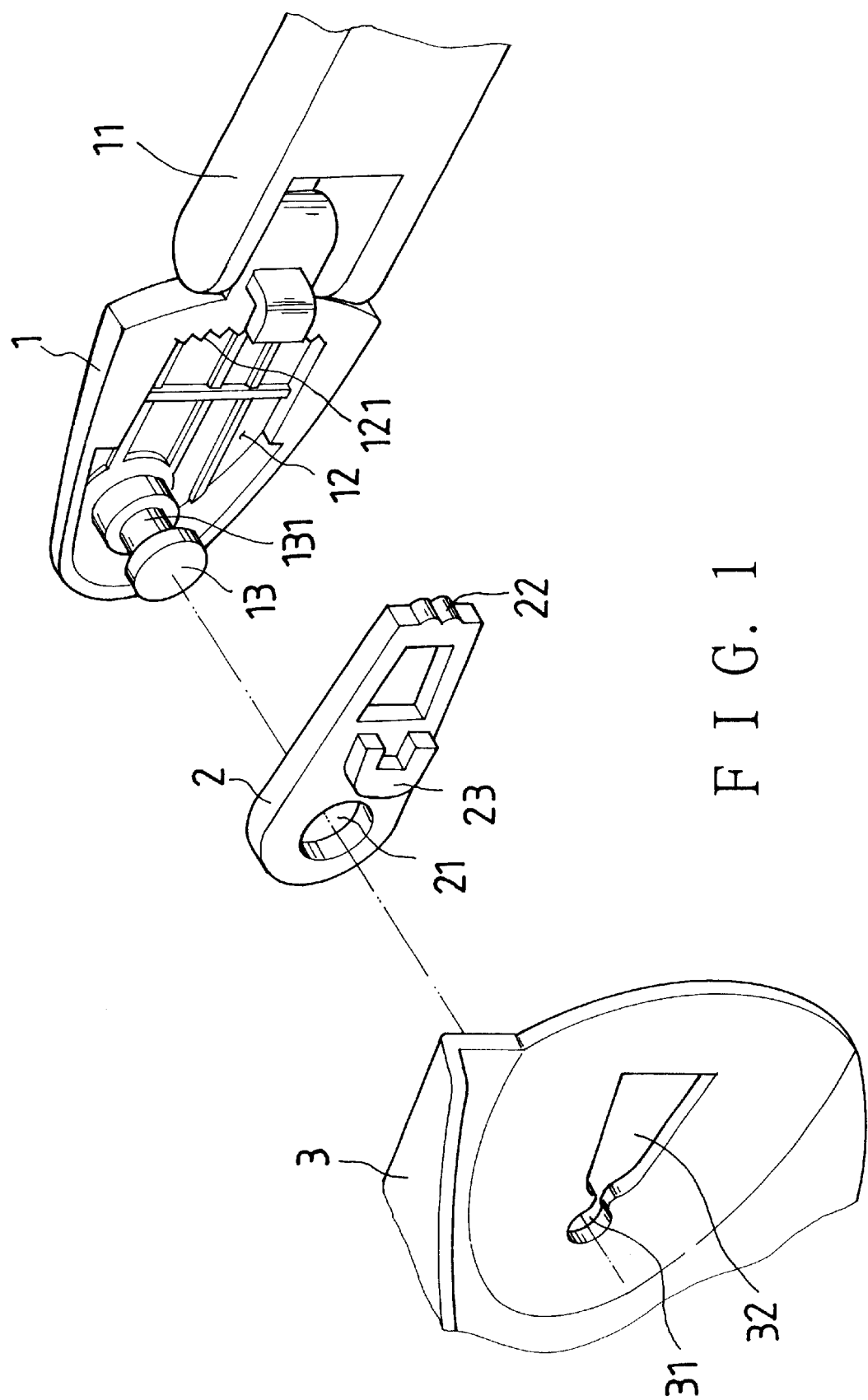
FIG. 1 is an exploded perspective view of a temple adjusting device for eyeglasses of the present invention.

A preferred embodiment of a temple-adjusting device for eyeglasses in the present invention, as shown in FIG. 1, includes a movable base 1, and a fix member 2 combined together and then connected to a frame 3.

The movable base 1 has one end pivotally connected to an end of a temple 11, a chamber 12, a vertical saw-teeth portion 121 provided in a rear side of the chamber 12, a shaft 13 extending sidewise from a front portion and having an annular groove 131 in an intermediate section.

The fix member 2 has a shaft hole 21 bored in a front portion for the shaft 13 to fit and engage the annular groove 131 of the shaft 13, a saw-teeth section 22 formed in a rear end surface, and a U-shaped fit block 23 protruding outward from an intermediate portion.

The lens frame 3 has an insert hole 31 respectively bored in two opposite ends to engage the annular groove 131 of the shaft 13 of the movable base 1. The insert hole 31 is connected to an engage aperture 32 for the U-shaped fit block 23 of the fix member 2 to fit firmly therein.

Figure 3:
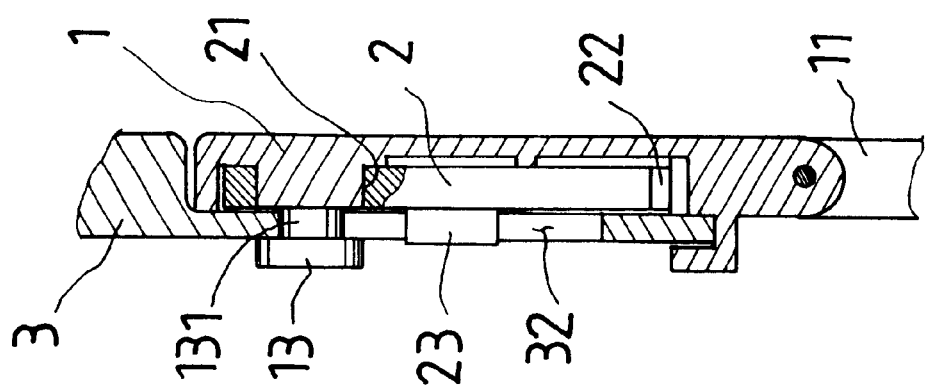
FIG. 3 is an upper cross-sectional view of the temple-adjusting device for eyeglasses of the present invention.
Figure 2:
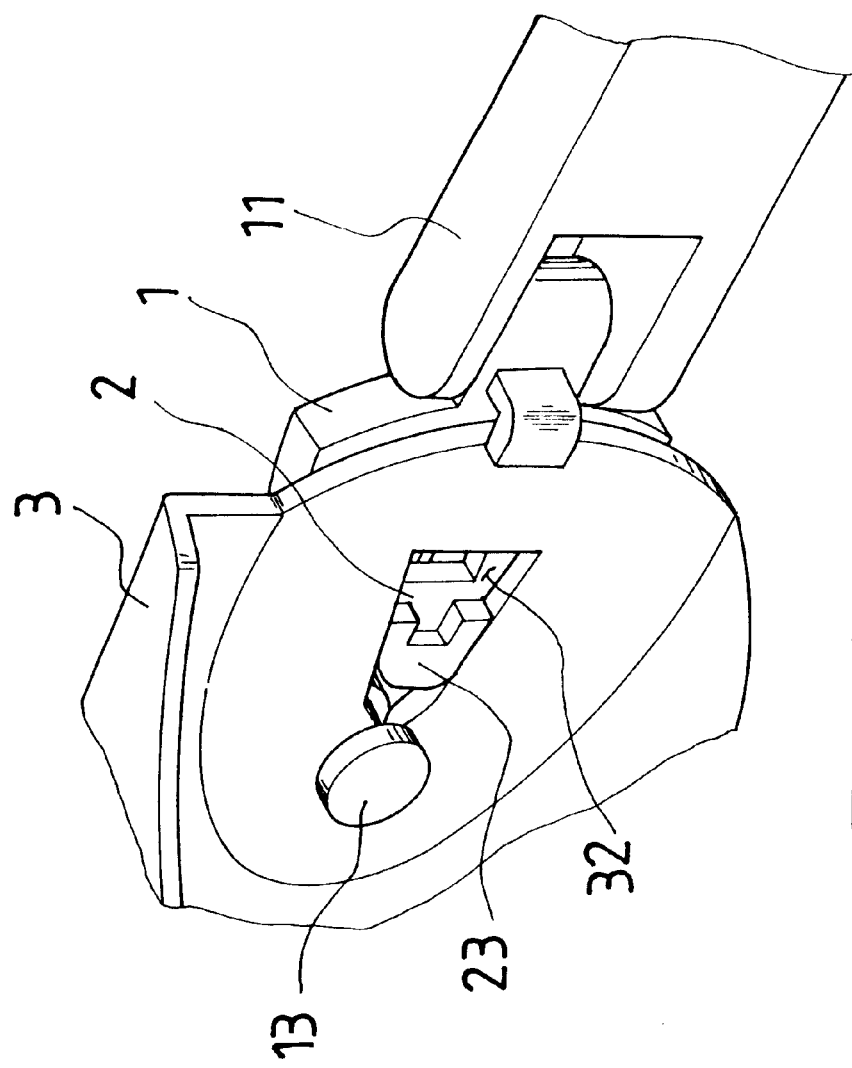
FIG. 2 is a perspective view of the temple adjusting device connected to a temple of the present invention.

In assembling, referring to FIGS. 2 and 3, firstly, pass the shaft 13 of the movable base 1 through the shaft hole of the fix member 2, and place the fix member 2 in the chamber 12 of the movable base 1. Then the saw-teeth section 121 engages the saw-teeth section 22 of the fix member 2, and let the annular groove 131 of the shaft 13 engage the insert hole 31 of the lens frame 3 to combine the temple adjusting device with the lens frame 3 pivotally. The U-shaped fit block 23 also may fit firmly in the engage aperture 32 of the lens frame 3, finishing assembly the temple 11 with the lens frame 3.

In using, referring to FIGS. 5 and 6, move up and down the temple, letting the U-shaped fit block 23 firmly located immovable in the aperture 32 of the lens frame 3. Then the temple 11 may move together with the movable base 1, with the shaft 13 fitting in the insert hole 31 rotated to let the saw-teeth section 22 of the fix member 2 engage with different teeth of the saw-teeth section 121 of the chamber 12 to fix the position of the movable base immovable and thus adjust the angle between the temple 11 and the lens frame 3. Two temples can also be assembled with two lenses with frame formed integral using this temple-adjusting device (not shown in the Figures).

As understood from the aforesaid description, two temples can be adjusted relative to a lens frame by means of the two saw-teeth sections formed in the movable base and the fix member changed in engaging position, permitting a wear feel comfortable.

What is claimed is:

1. A temple-adjusting device for eyeglasses comprising:

a movable base having a chamber formed inside, said chamber having a saw-teeth section formed in rear side edge, a shaft extending sidewise from a front inner surface and having an annular groove formed in an intermediate portion, and a rear end pivotally connected to a front end of a temple of eyeglasses;

a fix member positioned in said chamber of said movable base, having a shaft hole in a front portion for said shaft of said movable base to pass through, a rear end surface having saw-teeth engaging said saw-teeth section of said chamber of said movable base;

a lens frame having two ends respectively provided with an insert hole to engage said annular groove of said shaft of said movable base, and an aperture communicating with said insert hole and fitting with said fix member firmly;

said temple moved up or down to force said movable base also moved up or down with said shaft as a pivot, then said saw-teeth section of said chamber of said movable base changing a location engaging said saw-teeth of said fix member so that an angle between said temple and said lens frame may be adjusted.

* * * * *